US 6,675,175 B2

(12) United States Patent
Branch et al.

(10) Patent No.: US 6,675,175 B2
(45) Date of Patent: Jan. 6, 2004

(54) METHOD AND SYSTEM FOR SHARING CATALOGS IN A MULTIPROCESSING SYSTEM UTILIZING A SHARED PROCESSOR

(75) Inventors: Stephen Merritt Branch, Morgan Hill, CA (US); Patricia Driscoll Choi, San Jose, CA (US); Edward H. Daray, Jr., Saratoga, CA (US); Mark Edward Thomen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 56 days.

(21) Appl. No.: 09/253,671

(22) Filed: Feb. 19, 1999

(65) Prior Publication Data

US 2002/0023070 A1 Feb. 21, 2002

(51) Int. Cl.$^7$ ............................................. G06F 17/30
(52) U.S. Cl. ...................... 707/200; 707/204; 707/8; 707/9; 709/213; 709/248; 711/112
(58) Field of Search ........................... 707/1, 8, 9, 200, 707/205; 709/248, 213; 711/111, 112

(56) References Cited

U.S. PATENT DOCUMENTS

| | | | | |
|---|---|---|---|---|
| 4,408,273 A | * | 10/1983 | Plow ........................... | 364/200 |
| 5,077,658 A | | 12/1991 | Bendert et al. ................ | 707/1 |
| 5,193,168 A | * | 3/1993 | Corrigan et al. ............ | 395/425 |
| 5,247,649 A | | 9/1993 | Bandoh ....................... | 711/130 |
| 5,287,473 A | | 2/1994 | Mohan et al. .............. | 711/133 |
| 5,317,739 A | * | 5/1994 | Elko et al. .................. | 395/650 |
| 5,339,427 A | * | 8/1994 | Elko et al. .................. | 395/725 |
| 5,465,359 A | * | 11/1995 | Allen et al. ................. | 395/700 |
| 5,493,668 A | | 2/1996 | Elko et al. .................. | 711/130 |
| 5,530,829 A | | 6/1996 | Beardsley et al. .......... | 711/113 |
| 5,537,574 A | | 7/1996 | Elko et al. .................. | 711/141 |
| 5,546,579 A | | 8/1996 | Josten et al. .................... | 707/8 |
| 5,664,155 A | | 9/1997 | Elko et al. .................. | 711/170 |
| 5,752,264 A | | 5/1998 | Blake et al. ................. | 711/144 |
| 5,758,334 A | * | 5/1998 | Knight, III et al. ............. | 707/2 |
| 5,813,032 A | * | 9/1998 | Bhargava et al. ............ | 711/130 |
| 5,848,241 A | * | 12/1998 | Misinai et al. ......... | 395/200.43 |
| 6,002,883 A | * | 12/1999 | Goldrian ..................... | 395/856 |
| 6,105,098 A | * | 8/2000 | Ninose et al. .............. | 710/200 |

OTHER PUBLICATIONS

"ICF Catalog Sharing Protocol at Record Key Granularity," *IBM Technical Disclosure Bulletin*, vol. 35, No. 4B, Sep. 1992, 290.

* cited by examiner

Primary Examiner—John Breene
Assistant Examiner—Khanh B. Pham
(74) Attorney, Agent, or Firm—Sawyer Law Group LLP

(57) ABSTRACT

A method and system for sharing a catalog in a multiprocessor system is disclosed. The multiprocessor system includes a plurality of host systems. The method and system comprises storing a copy of an entire volume data record of the catalog in a processor. Thereafter, the method and system comprises reading sharing information of the catalog from the processor to the appropriate host system when the appropriate host system needs access to the catalog. For example, in a S/390 parallel processor system an enhanced catalog sharing system (ECS) is utilized in conjunction with the catalogs. In this type of system, a copy of the entire data VSAM volume record (VVR) for an ECS-active catalog is stored in a coupling facility processor. This processor is accessed using components of the S/390 product. When an ECS-active host system needs access to an ECS-active catalog, the sharing information is read in from the coupling facility processor instead of a DASD volume. If the shared catalog request involves an update to the ECS-active catalog, the (VVR) in the coupling facility is updated; no writes are performed to DASD for updates to the sharing subcell. By storing the sharing control data on a shared processor, the I/O operations and the disk lock outs are eliminated, dramatically decreasing elapsed time for a shared catalog request and increasing the availability of the disk device. This results in a significant performance improvement, with shared catalog performance approaching that of unshared catalogs.

16 Claims, 3 Drawing Sheets

METHOD AND SYSTEM FOR SHARING CATALOGS IN A MULTIPROCESSING SYSTEM UTILIZING A SHARED PROCESSOR

FIELD OF THE INVENTION

The present invention relates generally to catalogs in multiple data processing systems and more particularly to the sharing of catalogs in such a system.

BACKGROUND OF THE INVENTION

In today's information technology industry, customers desire systems that have better performance and cost improvements over their current systems, while permitting continued use of their existing applications. High availability is also important given today's rising mobile workforce and ability for global connectivity through the Internet. Current processing system designs for information technology applications must provide scalable, granular growth, and continuous application availability. Clustering technology, such as IBM Corporation's S/390 Parallel Sysplex, has been developed to achieve these design needs.

A cluster arrangement links individual data processing systems in a manner that creates a single, powerful system, which can support numerous users simultaneously. A cluster offers high availability and excellent scalability. If one system/node in the cluster fails, the other systems in the cluster continue to run.

In such a multiprocessor system, catalogs typically are used to categorize data. Typically, in cluster arrangements such as IBM's S/390, an integrated catalog facility (ICF) structure is utilized to support shared catalogs. A catalog is a data set which contains information about other data sets. It provides users with the ability to locate a data set by name, without knowing where the data set resides. By cataloging data sets, users will need to know less about the storage setup. Thus, data can be moved from one device to another, without requiring a change in statements which refer to an existing data set.

Cataloging data sets simplifies backup and recovery procedures. Catalogs are the central information point for VSAM data sets: all VSAM data sets must be cataloged. In addition, all SMS-managed data sets must be cataloged.

In conventional systems, an ICF Catalog component supports shared catalogs by maintaining a local system cache of recently accessed catalog records in main memory on each system and a list of catalog updates in what is called a "sharing subcell" in the data VSAM Volume Record (VVR) contained in the VSAM Volume Data Set (VVDS) on a DASD memory subsystem. Whenever a request is made to a shared catalog, the Catalog component must read the sharing subcell from the DASD memory subsystem, to verify the currency of the locally cached records on that system.

The local DASD subsystem is updated from the change information contained in the sharing subcell. If a catalog request involves a modification to the catalog, this information is written to the sharing subcell on the DASD subsystem. Significant overhead in terms of cross-system communication and long-duration I/O activity occurs for each such catalog request. Field experience indicates the elapsed time to process a request against a shared catalog can be up to five times longer than the same request against an unshared catalog.

In order for a system to access this data, the disk must be locked out from all other systems while the I/O operation executes. This approach is time-consuming and also makes the disk unavailable to other systems for relatively long periods of time. Accordingly, what is needed is a system and method which overcomes the above-mentioned problems. The present invention addresses such a need.

SUMMARY OF THE INVENTION

A method and system for sharing a catalog in a multiprocessor system is disclosed. The multiprocessor system includes a plurality of host systems. The method and system comprises storing an entire volume data record for the catalog in a shared processor. Thereafter, the method and system comprises reading sharing information of the catalog from the processor to the appropriate host system when the appropriate host system needs access to the catalog.

For example, in a S/390 parallel processor system an enhanced catalog sharing system (ECS) is utilized in conjunction with the catalogs. In this type of system, the entire data VSAM volume record (VVR) for an ECS-active catalog is stored in a coupling facility processor. This processor is accessed using components of the S/390 product. When an ECS-active host system needs access to an ECS-active catalog, the sharing information is read in from the coupling facility processor instead of a DASD volume. If the shared catalog request involves an update to the ECS-active catalog, the (VVR) in the coupling facility is updated; no writes are performed to DASD for updates to the sharing subcell.

By storing the sharing control data on a shared processor, the I/O operations and the disk lock outs are eliminated, dramatically decreasing elapsed time for a shared catalog request and increasing the availability of the disk device. This results in a significant performance improvement, with shared catalog performance approaching that of unshared catalogs.

DETAILED DESCRIPTION

The present invention relates to data sharing through the use of catalogs in a multiprocessing system arrangement. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

It should be appreciated that the following discussion refers to an S/390 parallel sysplex arrangement. This is meant as illustrative of a preferred embodiment, the features of which are applicable in other substantially equivalent arrangements of multiple systems in which catalogs are shared. Thus, the following discussion is meant as illustrative and not restrictive of the aspects of the present invention.

The present invention provides for enhanced catalog sharing (ECS) by utilizing a processor for storing an entire data volume record. In so doing the host computers can access the processor directly rather than having to obtain the information from a DASD memory subsystem. This results in a significant performance improvement.

Figure 1:
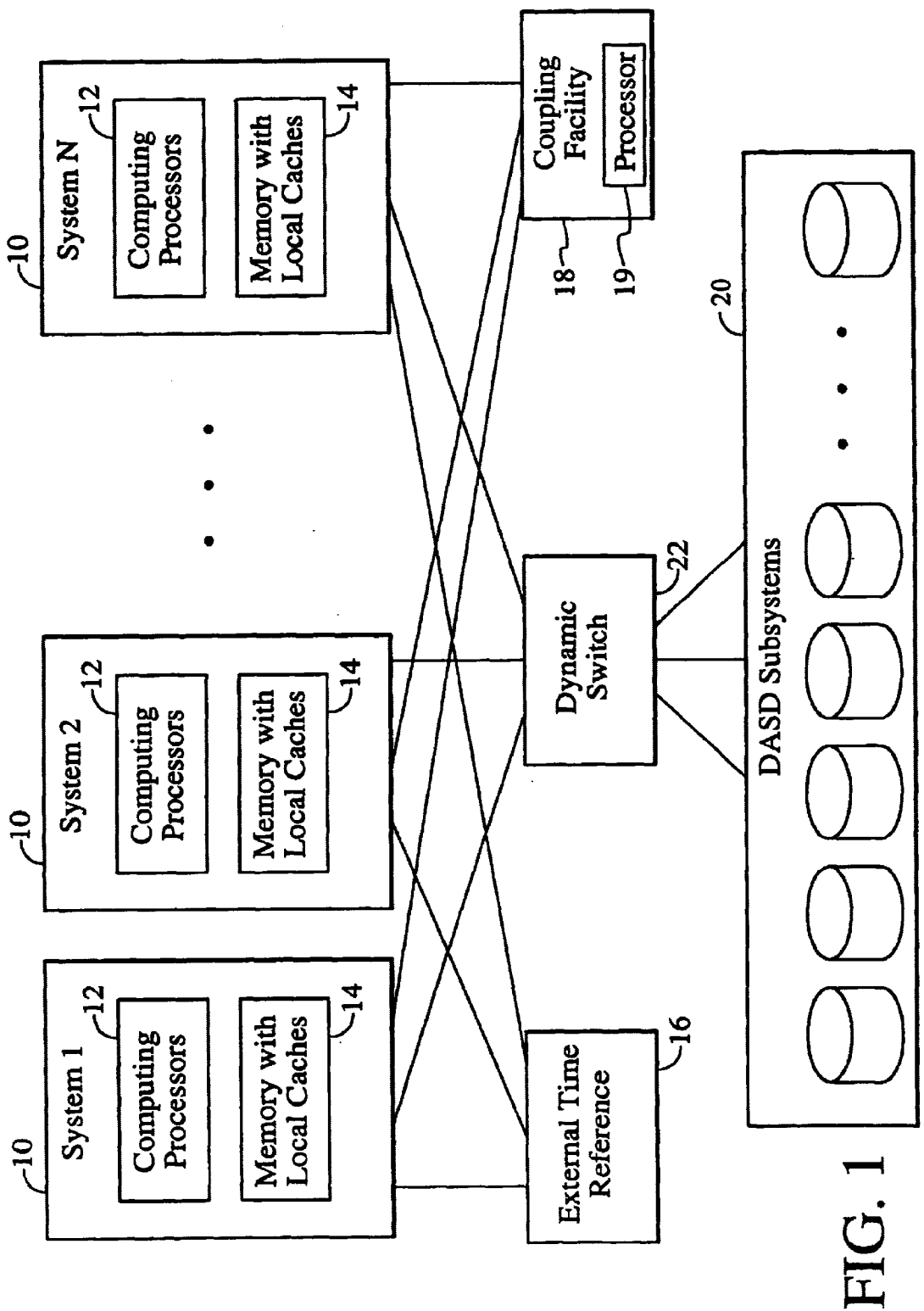
FIG. 1 illustrates a block diagram representation of an arrangement of multiple data processing systems.

To more fully understand the operation of the present invention in the context of a multiprocessing system, refer now to FIG. 1. FIG. 1 illustrates a cluster arrangement, e.g., a parallel sysplex system. Multiple host systems 10, e.g., System 1 to System N, are included in the sysplex, where each system 10 has one or more computing processors 12 and memory with local caches 14. By way of example, the System/390 Parallel Sysplex from IBM Corporation, Armonk, N.Y., is an example of a set of S/390 systems connected together by a clustering technology. An instance of the operating system, OS/390, runs on each system of the sysplex. Each of the systems access DASD (direct access storage device) 20 that is shared among the systems. The clustered system support enables large business applications to be spread across the multiple systems with dynamic workload balancing, which yields a wide range of application capacity scaling and extremely high application availability across planned and unplanned outage of individual systems. The load-balancing and availability features of parallel sysplex result in an application running on one system at one point in time and then run on another system at another point in time. To help facilitate the activity, the systems 10 are each coupled to an external time reference component 16 and a coupling facility 18. Connections to DASD subsystems 20 are facilitated through a dynamic switch 22.

In such a multiprocessor system, catalogs typically are used to categorize data. Typically, in cluster arrangements such as IBM's S/390, an integrated catalog facility (ICF) structure is utilized to support shared catalogs. A catalog is a data set which contains information about other data sets. It provides users with the ability to locate a data set by name, without knowing where the data set resides. By cataloging data sets, users will need to know less about the storage setup. Thus, data can be moved from one device to another, without requiring a change in statements which refer to an existing data set.

Typically a catalog is utilized to locate data sets in the multiprocessor system. An ICF catalog includes two separate kinds of data sets: a basic catalog structure (BCS); and a VSAM volume data set (VVDS). The BCS can be considered the catalog, whereas the VVDS can be considered an extension of the volume table of contents (VTOC).

The basic catalog structure is a VSAM key-sequenced data set. It uses the data set name of entries to store and retrieve data set information. For VSAM data sets, the BCS contains volume, security, ownership, and association information. For non-VSAM data sets, the BCS contains volume, ownership, and association information.

The VSAM volume data set is a VSAM entry-sequenced data set. A VVDS resides on every volume which contains a VSAM or a storage management subsystem (SMS) managed data set cataloged in an ICF catalog. It contains the data set characteristics, extent information, and the volume-related information of the VSAM data sets cataloged in the BCS. If the SMS is utilized, the VVDS also contains data set characteristics and volume-related information for the SMS managed data sets on the volume.

The Volume Table of Contents (VTOC) and the VTOC index are system data sets which maintain extent and allocation information for a volume. The VTOC is used to find empty space for new allocations and to locate non-VSAM data sets. For all VSAM data sets, and for SMS-managed non-VSAM data sets, the VTOC is used to obtain information not kept in the VVDS.

VVDS records for VSAM data sets are called "VSAM volume records" (VVRs). Those for SMS-managed non-VSAM data sets are called "non-VSAM volume records" (NVRs). If a non-VSAM data set spans volumes, its NVR is in the VVD of the data set's first volume. Since a BCS is a VSAM data set, it also has a VVR in the VVDS.

Every ICF catalog includes one BCS and one or more VVDSs. A BCS does not "own" a VVDS: more than one BCS can have entries for a single VVDS. Every VVDS which is connected to a BCS has an entry in the BCS.

Figure 2:
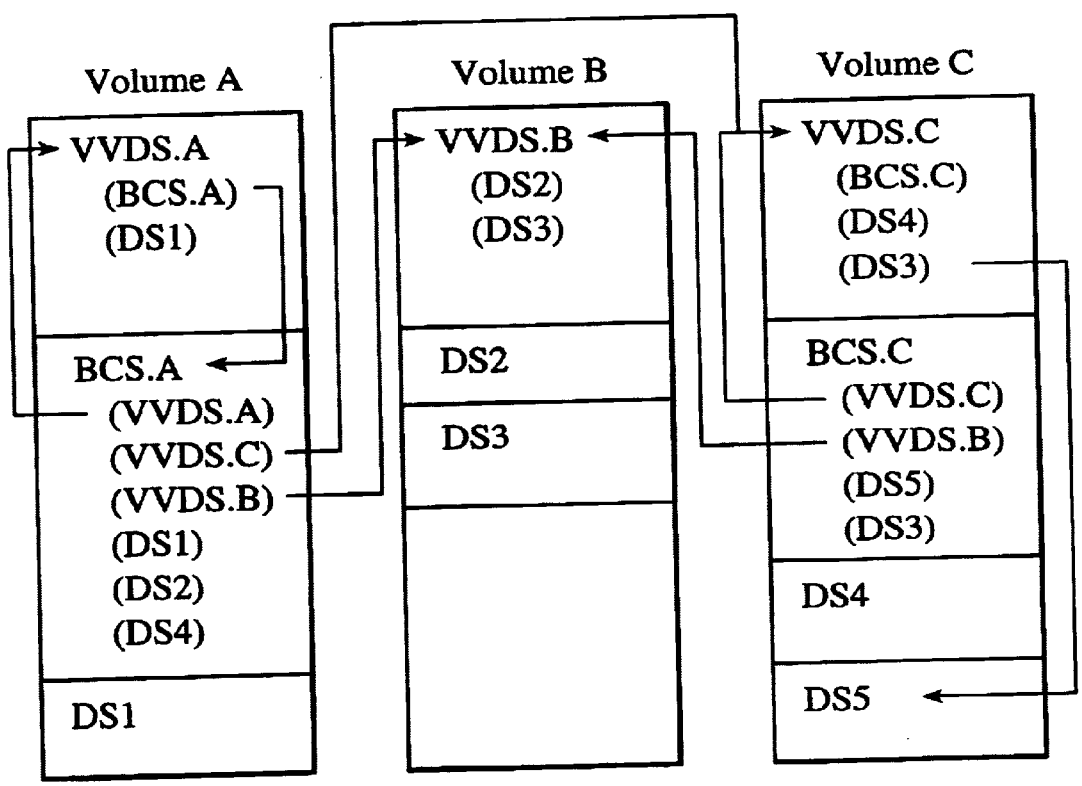
FIG. 2 illustrates a possible relationship between two basic catalog structures (BCSs) and three VSAM volume data sets (VVDs).

For example, FIG. 2 shows a possible relationship between two BCSs and three VVDSs on three disk volumes. "BCS.A" has entries for data sets residing on each of the three volumes. "BCS.C" has entries for data sets residing on volumes B and C. Since each volume has data sets cataloged in an integrated catalog facility catalog, each volume contains a VVDS.

BCS.A resides on volume A with VVDS.A. Both the VVDS and the BCS have entires for each other. All three VVDSs are cataloged in BCS.A. BCS.C, residing on volume C, contains entries for VVDS.C and VVDS.B. VVDS has entries for all VSAM and SMS-managed data sets on its volume, whereas a BCS can have entries for data sets residing on any volume.

Information about a data set is also contained in the VTOC of the volume on which the data set resides, even if the data set is cataloged. To successfully perform all possible operations on a cataloged data set using the catalog, all three elements, the VVDS, BCS, and VTOC, must be synchronized. That is, any equivalent information contained in the BCS and VVDS entries for the data set, and the VTOC DSCB for the data set, must be the same.

Cataloging data sets simplifies backup and recovery procedures. Catalogs are the central information point for VSAM data sets: all VSAM data sets must be cataloged. In addition, all SMS-managed data sets must be cataloged.

In conventional IBM multiprocessor systems, an ICF Catalog component supports shared catalogs by maintaining a local system cache of recently accessed catalog records in main memory of that system and a list of catalog updates in what is called a "sharing subcell" in the data VSAM Volume Record (VVR) contained in the VVDS on one of the DASD memory subsystems 10. Whenever a request is made to a shared catalog, the catalog component must read the sharing subcell from the one of the DASD memory subsystems 10 to ensure the locally cached BCS records are still valid on the local system.

The one DASD subsystem 10 is updated from the change information contained in the "sharing subcell". If a catalog request involves a modification to the catalog, this information is written to the sharing subcell on the one DASD subsystem 10. Significant overhead in terms of cross-system communication and long-duration I/O activity occurs for each such catalog request. Field experience indicates the elapsed time to process a request against a shared catalog can be up to five times longer than the same request against an unshared catalog.

In order for a system to access this data, the disk on the one DASD subsystem 10 must be locked out from all other systems while the I/O operation executes. This approach is time-consuming and also makes the disk unavailable to other systems for relatively long periods of time.

The present invention provides for enhanced catalog sharing (ECS) by utilizing a processor for storing an entire data volume record. The processor contains control data for catalogs being shared among host systems. The processor also allows for cross-notification between systems when changes occur to the catalog control data. In so doing the host computers can access the processor directly rather than having to obtain the information from a DASD memory subsystem. This results in a significant performance improvement.

Figure 3:
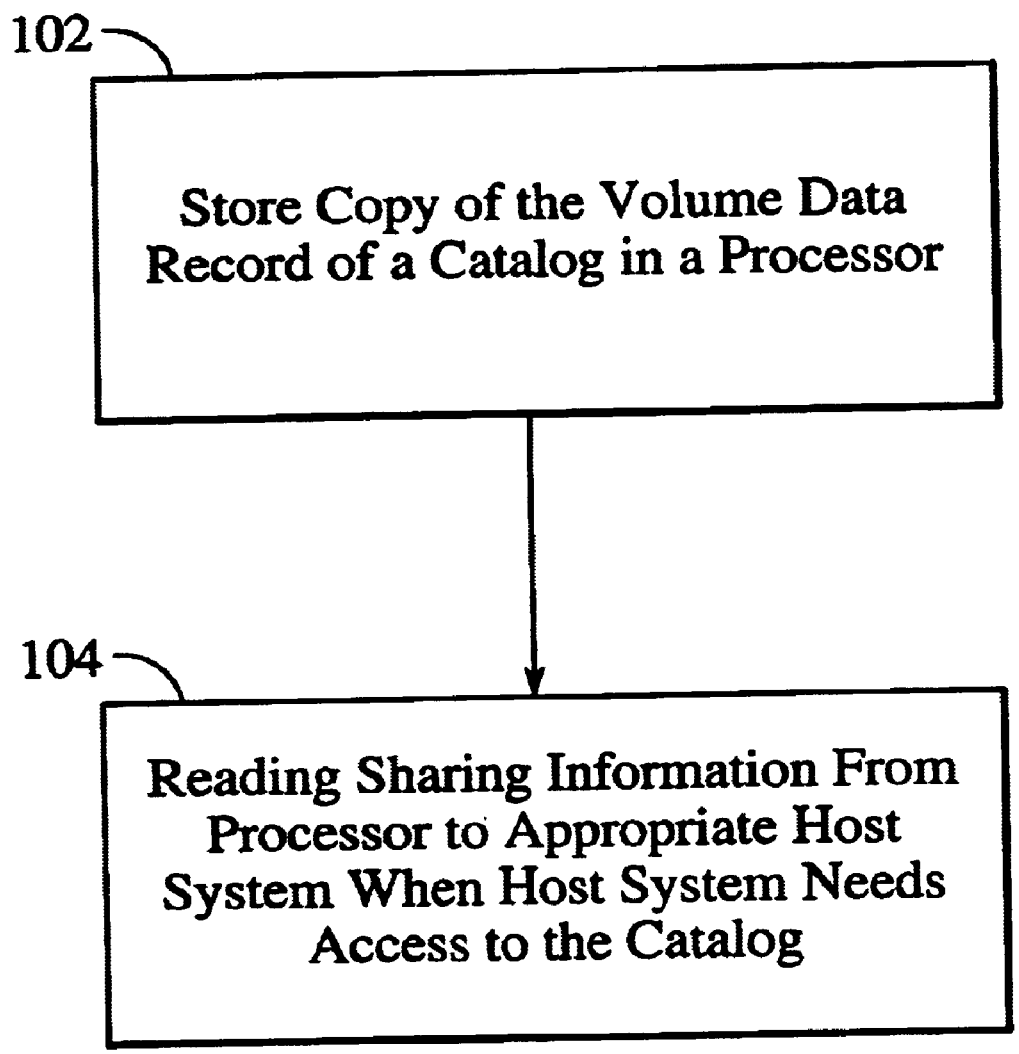
FIG. 3 is a flow chart of the operation of a system in accordance with the present invention.

To more particularly describe the present invention, refer to the following discussion. FIG. 3 is a flow chart of the operation of the system and method in accordance with the present invention. First, an entire volume data record of the catalog is stored in a processor, via step 102. Thereafter, sharing information of data records from the processor is read to the appropriate host system when the appropriate host system needs access to the catalog, via step 104.

In this embodiment the processor 19 which stores the data record is the coupling facility 18. It should be understood that the processor could be in another area of the multiprocessor system, the key feature being that the Systems 10 can access the processor directly.

When utilizing the system of FIG. 1, the present invention allows for the storage of the entire data VVR for an ECS-active catalog, in the coupling facility processor 19. The VVR is accessed using the components of the host systems 10. When an ECS-active catalog is to be accessed by one of the Systems 10 the sharing information is read in from the coupling facility instead of DASD. If the shared catalog request involves an update to the ECS-active catalog, the VVR in the coupling facility 18 is updated; no writes are performed to the DASD subsystem for updates to the sharing subcell. This results in a significant performance improvement, with shared catalog performance approaching that of unshared catalogs.

The present invention provides for enhanced catalog sharing (ECS) by utilizing a processor for storing an entire data volume record. In so doing the host computers can access the processor directly rather than having to obtain the information from a DASD memory subsystem. The use of processor eliminates the need to perform I/O to the disk to track, record, or communicate these changes. Accordingly, a significant performance improvement is realized over conventional catalog sharing systems.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for sharing a catalog of a data set in a multiprocessor system, the multiprocessor system including a plurality of host systems and a plurality of direct access storage device (DASD) subsystems, comprising the steps of:

(a) storing a copy of an entire data volume record of the catalog in a coupling facility, wherein the catalog is shared by the plurality of host systems, wherein the data volume record includes catalog updates, wherein the data volume record in the coupling facility is updated with the catalog updates responsive to a shared catalog request from a first host system if the shared catalog request involves a catalog update, and wherein the coupling facility is detached from the plurality of DASD subsystems; and (b) reading the catalog updates directly from the data volume record in the coupling facility to a first host system of the plurality of host systems when the first host system needs access to the catalog, wherein the catalog updates are not stored in the DASD subsystems, wherein access to the plurality of DASD subsystems is eliminated.

2. The method of claim 1 wherein a multiprocessor system comprises a parallel multiprocessing system.

3. The method of claim 1 wherein a multiprocessor system includes a plurality of direct access storage device (DASD) subsystems.

4. The method of claim 3 wherein the volume data record comprises a virtual storage access method (VSAM) volume data record (VVR).

5. The method of claim 4 which includes the step of (c) updating the VVR responsive to a shared catalog request from one of the host subsystems.

6. A system for sharing a catalog of a data set in a multiprocessor system, the multiprocessor system including a plurality of host systems and a plurality of direct access storage device (DASD) subsystems, comprising:

means for storing a copy of an entire data volume record of the catalog in a coupling facility, wherein the catalog is shared by the plurality of host systems, wherein the data volume record includes catalog updates, wherein the data volume record in the coupling facility is updated with the catalog updates responsive to a shared catalog request from a first host system if the shared catalog request involves a catalog update, and wherein the coupling facility is detached from the plurality of DASD subsystems; and means for reading the catalog updates directly from the data volume record in the coupling facility to the appropriate host system when the appropriate host system needs access to the catalog, wherein the catalog updates are not stored in the DASD subsystems, wherein access to the plurality of DASD subsystems is eliminated.

7. The system of claim 6 wherein a multiprocessor system comprises a parallel multiprocessing system.

8. The system of claim 6 wherein a multiprocessor system includes a plurality of direct access storage device (DASD) subsystems.

9. The system of claim 8 wherein the volume data record comprises a virtual storage access method (VSAM) volume data record (VVR).

10. The system of claim 9 which includes means for updating the VVR responsive to a shared catalog request from one of the host subsystems.

11. A method for sharing a catalog of a data set in a multiprocessor system, the multiprocessor system including a plurality of host systems and a plurality of direct access storage device (DASD) subsystems, the method comprising the steps of:

(a) providing a dynamic switch for coupling the plurality of host systems to the plurality of DASD subsystems;

(b) storing a copy of an entire data volume record of the catalog in a coupling facility, wherein the catalog is shared by the plurality of host systems, wherein the data volume record includes catalog updates, wherein the data volume record in the coupling facility is updated with the catalog updates responsive to a shared catalog request from a first host system if the shared catalog request involves a catalog update, and wherein the coupling facility is detached from the plurality of DASD subsystems; and (c) reading the catalog updates directly from the data volume record in the coupling facility to the appropriate host system when the appropriate host system needs access to the catalog, wherein the catalog updates are not stored in the DASD subsystems, wherein access to the plurality of DASD subsystems is eliminated.

12. A system for sharing a catalog of a data set in a multiprocessor system, the multiprocessor system including a plurality of host systems, the system comprising:

a plurality of direct access storage device (DASD) subsystems;

a dynamic switch coupling the plurality of host systems to the plurality of DASD subsystems;

means for storing a copy of an entire data volume record of the catalog in a coupling facility, wherein the catalog is shared by the plurality of host systems, wherein the data volume record includes catalog updates, wherein the data volume record in the coupling facility is updated with the catalog updates responsive to a shared catalog request from a first host system if the shared catalog request involves a catalog update, wherein the coupling facility is detached from the plurality of DASD subsystems; and means for reading the catalog updates directly from the data volume record in the coupling facility to the appropriate host system when the appropriate host system needs access to the catalog, and wherein the catalog updates are not stored in the DASD subsystems, wherein access to the plurality of DASD subsystems is eliminated.

13. The method of claim 1 further comprising the step of (c) determining if the data volume record in the coupling facility has been updated by one of the host systems of the plurality of host systems.

14. The method of claim 6 further comprising means for determining if the data volume record in the coupling facility has been updated by one of the host systems of the plurality of host systems.

15. The method of claim 11 further comprising the step of (d) determining if the data volume record in the coupling facility has been updated by one of the host systems of the plurality of host systems.

16. The method of claim 12 further comprising means for determining if the data volume record in the coupling facility has been updated by one of the host systems of the plurality of host systems.

* * * * *